United States Patent
Buckley

(10) Patent No.: US 9,615,311 B2
(45) Date of Patent: Apr. 4, 2017

(54) METHODS AND APPARATUS FOR THE COMMUNICATION OF CELLULAR NETWORK INFORMATION BETWEEN A WIRELESS LOCAL AREA NETWORK AND A MOBILE STATION

(75) Inventor: Adrian Buckley, Tracy, CA (US)

(73) Assignee: BlackBerry Limited, Waterloo, Ontario (CA)

( * ) Notice: Subject to any disclaimer, the term of this patent is extended or adjusted under 35 U.S.C. 154(b) by 813 days.

(21) Appl. No.: 11/959,081

(22) Filed: Dec. 18, 2007

(65) Prior Publication Data

US 2008/0144589 A1    Jun. 19, 2008

Related U.S. Application Data

(63) Continuation of application No. 10/696,806, filed on Oct. 30, 2003, now Pat. No. 7,395,083.

(51) Int. Cl.
  *H04W 4/00* (2009.01)
  *H04W 48/10* (2009.01)
  (Continued)

(52) U.S. Cl.
  CPC ............ *H04W 48/10* (2013.01); *H04W 8/26* (2013.01); *H04W 36/0011* (2013.01);
  (Continued)

(58) Field of Classification Search
  CPC ..... H04W 88/08; H04W 8/005; H04W 48/10; H04W 52/0216; H04W 88/06;
  (Continued)

(56) References Cited

U.S. PATENT DOCUMENTS 5,796,727 A     8/1998  Harrison et al.
6,081,826 A *   6/2000  Masuoka et al. ............. 718/100
                      (Continued)

FOREIGN PATENT DOCUMENTS

EP         1 096 728        5/2001
EP         1 528 715        5/2005
                      (Continued)

OTHER PUBLICATIONS

3GPP TS 23.234 v2.0.0 (Sep. 2003): $3^{rd}$ Generation Partnership Project; Technical Specification Group Services and Systems Aspects; 3GPP System to Wireless Local Area Network (WLAN); System Description (Release 6).*

(Continued)

*Primary Examiner* — Fred Casca
(74) *Attorney, Agent, or Firm* — Fish & Richardson P.C.

(57) ABSTRACT

Methods and apparatus for the communication of cellular network information between a wireless local area network (WLAN) and a mobile station are disclosed. In one illustrative example, the mobile station receives a generic container message from the WLAN. The generic container message includes cellular network information associated with one or more available cellular networks previously received by the WLAN. The generic container message is not technology or standard-specific, as it may contain cellular network information from a variety of different cellular networks (e.g. 3GPP, 3GPP2, IETF, etc.). The mobile station decodes the generic container message to identify and store the cellular network information in its memory. Preferably, the cellular network information includes information for identifying the cellular networks so that the mobile station may appropriately select one of the cellular networks for communication.

8 Claims, 5 Drawing Sheets

(51) Int. Cl.
| | |
|---|---|
| H04W 8/26 | (2009.01) |
| H04W 80/00 | (2009.01) |
| H04W 36/00 | (2009.01) |
| H04W 36/14 | (2009.01) |
| H04W 84/12 | (2009.01) |
| H04W 80/04 | (2009.01) |

(52) U.S. Cl.
CPC ........... *H04W 36/14* (2013.01); *H04W 80/00* (2013.01); *H04W 80/04* (2013.01); *H04W 84/12* (2013.01)

(58) Field of Classification Search
CPC ..... H04W 84/12; H04W 80/00; H04W 48/20; H04W 72/005; H04W 72/0406; H04W 74/00; H04W 74/002; H04W 76/022; H04W 84/042; H04W 88/10; H04W 8/22; H04W 8/26; H04W 92/02; H04W 36/0011; H04W 36/14; H04W 80/04; H04W 8/04; H04W 8/02; H04W 4/12; H04W 60/00; H04W 12/06; H04W 36/12
USPC ... 455/422, 422.1, 432.1, 435.2, 466, 456.1, 455/78, 456.2, 552.1, 414.1, 426.1, 433; 370/335, 342, 441, 347, 331, 338, 329, 370/328, 537

See application file for complete search history.

(56) References Cited

U.S. PATENT DOCUMENTS

| | | | |
|---|---|---|---|
| 6,393,261 | B1 | 5/2002 | Lewis |
| 6,950,419 | B1 | 9/2005 | Park et al. |
| 7,251,488 | B2 | 7/2007 | Chitrapu |
| 7,395,083 | B2 | 7/2008 | Buckley |
| 7,441,043 | B1* | 10/2008 | Henry et al. .................. 709/238 |
| 7,519,363 | B2 | 4/2009 | Shin et al. |
| 7,778,641 | B1* | 8/2010 | Willars et al. ................ 455/436 |
| 2002/0136226 | A1 | 9/2002 | Christoffel et al. |
| 2002/0183060 | A1 | 12/2002 | Ko et al. |
| 2002/0191575 | A1 | 12/2002 | Kalavade et al. |
| 2003/0026223 | A1 | 2/2003 | Eriksson et al. |
| 2003/0028763 | A1 | 2/2003 | Malinen et al. |
| 2003/0031148 | A1 | 2/2003 | Schmidt et al. |
| 2003/0119481 | A1 | 6/2003 | Haverinen et al. |
| 2003/0133421 | A1 | 7/2003 | Sundar et al. |
| 2003/0134650 | A1 | 7/2003 | Sundar et al. |
| 2003/0214905 | A1* | 11/2003 | Solomon ............... H04L 1/0026 370/229 |
| 2003/0228842 | A1* | 12/2003 | Heinonen et al. ........... 455/41.2 |
| 2004/0008723 | A1* | 1/2004 | Uchida et al. ................ 370/466 |
| 2004/0066756 | A1* | 4/2004 | Ahmavaara et al. ......... 370/328 |
| 2004/0114601 | A1* | 6/2004 | Watanabe et al. ......... 370/395.2 |
| 2004/0181692 | A1 | 9/2004 | Wild et al. |
| 2004/0249983 | A1* | 12/2004 | Bedner ........................ 709/249 |
| 2005/0059397 | A1 | 3/2005 | Zhao |
| 2005/0094593 | A1 | 5/2005 | Buckley |
| 2005/0181776 | A1 | 8/2005 | Verma et al. |
| 2005/0232209 | A1 | 10/2005 | Buckley et al. |
| 2008/0095054 | A1* | 4/2008 | Morford ....................... 370/231 |
| 2008/0144589 | A1 | 6/2008 | Buckley |

FOREIGN PATENT DOCUMENTS

| | | | |
|---|---|---|---|
| WO | 9939524 | A1 | 8/1999 |
| WO | 2004034714 | | 4/2004 |

OTHER PUBLICATIONS

European Search Report for EP patent application 03025014.6, Mar. 29, 2004.
EAP SIM Authentication, Havernien et al, Oct. 27, 2003.
Cellular Access Control and Charging for Mobile Operator Wireless Local Area Networks, Haverinen et al., Dec. 2002.
"Analysis of Network Selection Methods," 3GPP TSG-SA WG2 meeting #32, San Diego, California, USA, May 12-16, 2003, 2 pages.
"WLAN Access Network Selection," 3GPP TSG-SA WG2 meeting #35, Bangkok, Thailand, Oct. 27-31, 2003, 3 pages.
3rd Generation Partnership Project (3GPP), "3GPP TS 23.234—Technical Specification Group Services and Systems Aspects; 3GPP system to Wireless Local Area Network (WLAN) Interworking; System Description (Release 6)," V2.0.0, Sep. 2003, 68 pages.
Australian Patent Office, "Notice of Acceptance," issued in connection with Australian Application No. 2004224976, on Aug. 30, 2007, 3 pages.
Canadian Intellectual Property Office, "Notice of Allowance," issued in connection with Canadian Application No. 2,486,323, on Jul. 8, 2008, 1 page.
Canadian Intellectual Property Office, "Exam Report," issued in connection with Canadian Application No. 2,486,323, on Jul. 16, 2007, 4 pages.
State Intellectual Property Office of People's Republic of China, "First Office Action," issued in connection with Chinese Application No. 200410089679.2, on Jul. 28, 2006, 16 pages.
State Intellectual Property Office of People's Republic of China, "Second Office Action," issued in connection with Chinese Application No. 200410089679.2, on Aug. 3, 2007, 1 page.
State Intellectual Property Office of People's Republic of China, "Third Office Action," issued in connection with Chinese Application No. 200410089679.2, on Jun. 6, 2008, 6 pages.
State Intellectual Property Office of People's Republic of China, "Notification of Grant of Rights for Invention of Patent," issued in connection with Chinese Application No. 200410089679.2, on Feb. 6, 2009, 4 pages.
European Patent Office, "Decision to Grant," issued in connection with European Application No. 03025014.6, on Jun. 5, 2009, 2 pages.
European Patent Office, "Exam Report," issued in connection with European Application No. 03025014.6, on Apr. 30, 2008, 4 pages.
European Patent Office, "Exam Report," issued in connection with European Application No. 03025014.6, on Aug. 29, 2007, 6 pages.
European Patent Office, "Intent to Grant," issued in connection with European Application No. 03025014.6, on Jan. 12, 2009, 6 pages.
European Patent Office, "Search Report," issued in connection with European Application No. 03025014.6, on Apr. 20, 2004, 4 pages.
European Patent Office, "Decision to Grant," issued in connection with European Application No. 04025655.4, on Nov. 19, 2009, 2 pages.
European Patent Office, "Exam Report," issued in connection with European Application No. 04025655.4, on May 30, 2008, 4 pages.
European Patent Office, "Exam Report," issued in connection with European Application No. 04025655.4, on Aug. 29, 2007, 7 pages.
European Patent Office, "Intent to Grant," issued in connection with European Application No. 04025655.4, on Jun. 15, 2009, 6 pages.
European Patent Office, "Search Report," issued in connection with European Application No. 04025655.4, on Dec. 9, 2004, 4 pages.
Japanese Patent Office, "Office Action," issued in connection with Japanese Application No. 2008-306868, on Feb. 10, 2011, 2 pages.
Japanese Patent Office, "Office Action," issued in connection with Japanese Application No. 2004-318623, on Sep. 28, 2009, 3 pages.
Japanese Patent Office, "Notice of Allowance," issued in connection with Japanese Application No. 2004-318623, on Apr. 14, 2010, 3 pages.
Japanese Patent Office, "Notice of Reasons for Rejection," issued in connection with Japanese Application No. 2004-318623, on May 29, 2008, 5 pages.
Korean Patent Office, "Notice of Decision for Patent," issued in connection with Korean Application No. 10-2004-0087349, on Apr. 18, 2007, 3 pages.
Mexican Institute of Industrial Property, "Office Action," issued in connection with Mexican Application No. PA/a/2004/010707, on Feb. 8, 2008, 2 pages.

(56) References Cited

OTHER PUBLICATIONS

Mexican Institute of Industrial Property, "Office Action," issued in connection with Mexican Application No. PA/a/2004/010707, on Apr. 24, 2008, 4 pages.
United States Patent and Trademark Office, "Notice of Allowance," issued in connection with U.S. Appl. No. 10/696,806, on Sep. 20, 2007 (17 pages).
United States Patent and Trademark Office, "Non-Final Office Action," issued in connection with U.S. Appl. No. 10/696,806, on Mar. 22, 2007 (12 pages).
ETSI; "Digital Enhanced Cordless Telecommunication (DECT); Common Interface (CI); Part 5: Network (NWK) Layer"; ETS 300 175-5; Dec. 1997; 271 pages; <http://www.etsi.org/deliver/etsi_i_ets/300100_300199/30017505/03_60/ets_30017505e03p.pdf>.
First Examination Report issued in Indian Application No. 2096/DEL/2004 on Dec. 4, 2014 (2 pages).
European Search Report in European Application No. 09162153.2, dated Sep. 1, 2009. 10 pages.
European Search Report in European Application No. 10179302.4, dated Oct. 26, 2010, 12 pages.
European Search Report in European Application No. 10179303.2, dated Oct. 26, 2010, 12 pages.
European Supplementary Search Report in European Application No. 04819552.3, dated Jul. 17, 2007, 5 pages.
International Search Report and Written Opinion in International Application No. PCT/US2004/039025, dated Jul. 6, 2006, 10 pages.
International Preliminary Report on Patentability in International Application No. PCT/US2004/039025, dated Aug. 7, 2006, 6 pages.

\* cited by examiner

FIG. 1
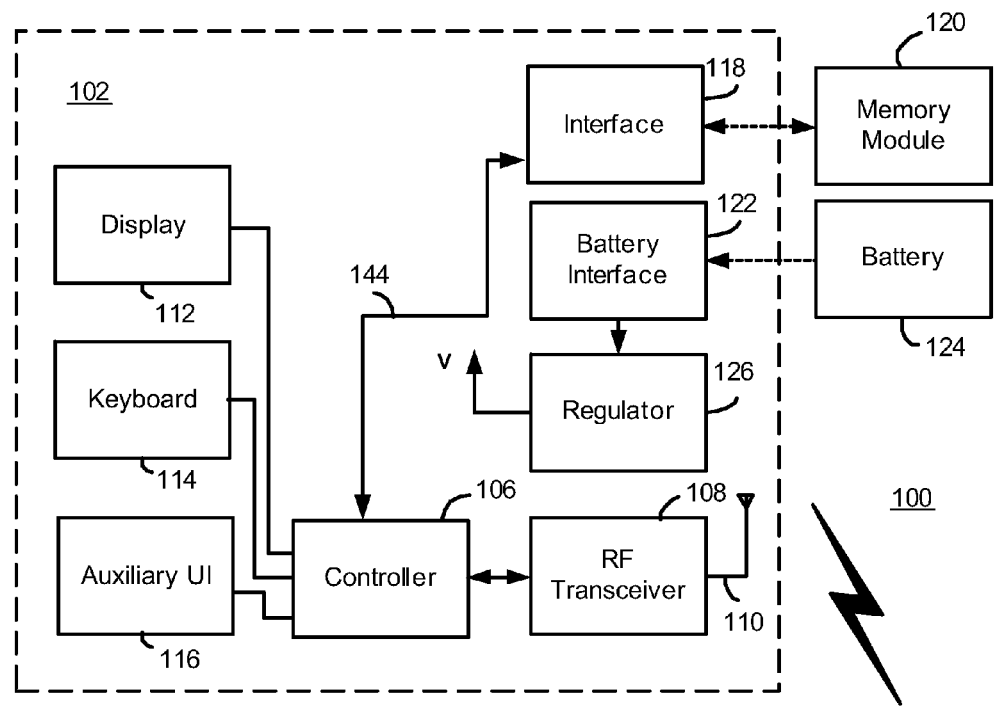
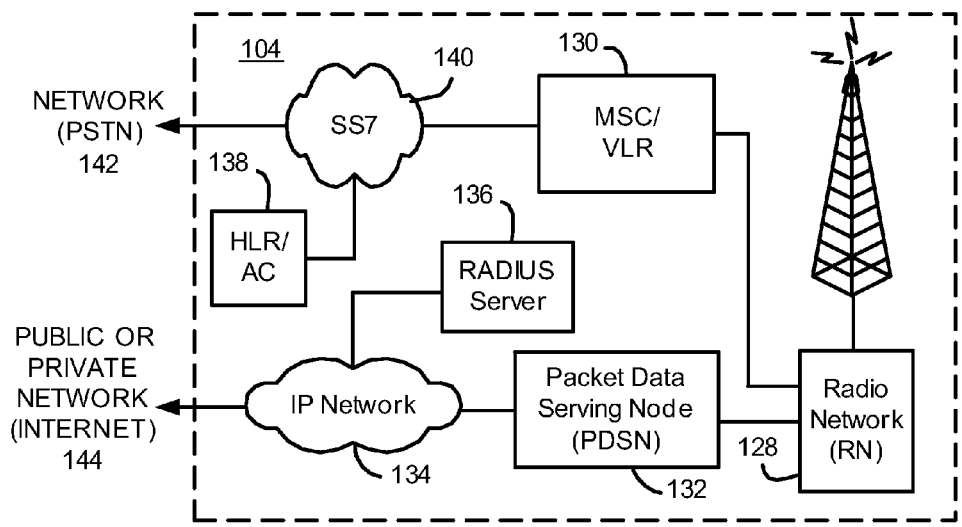

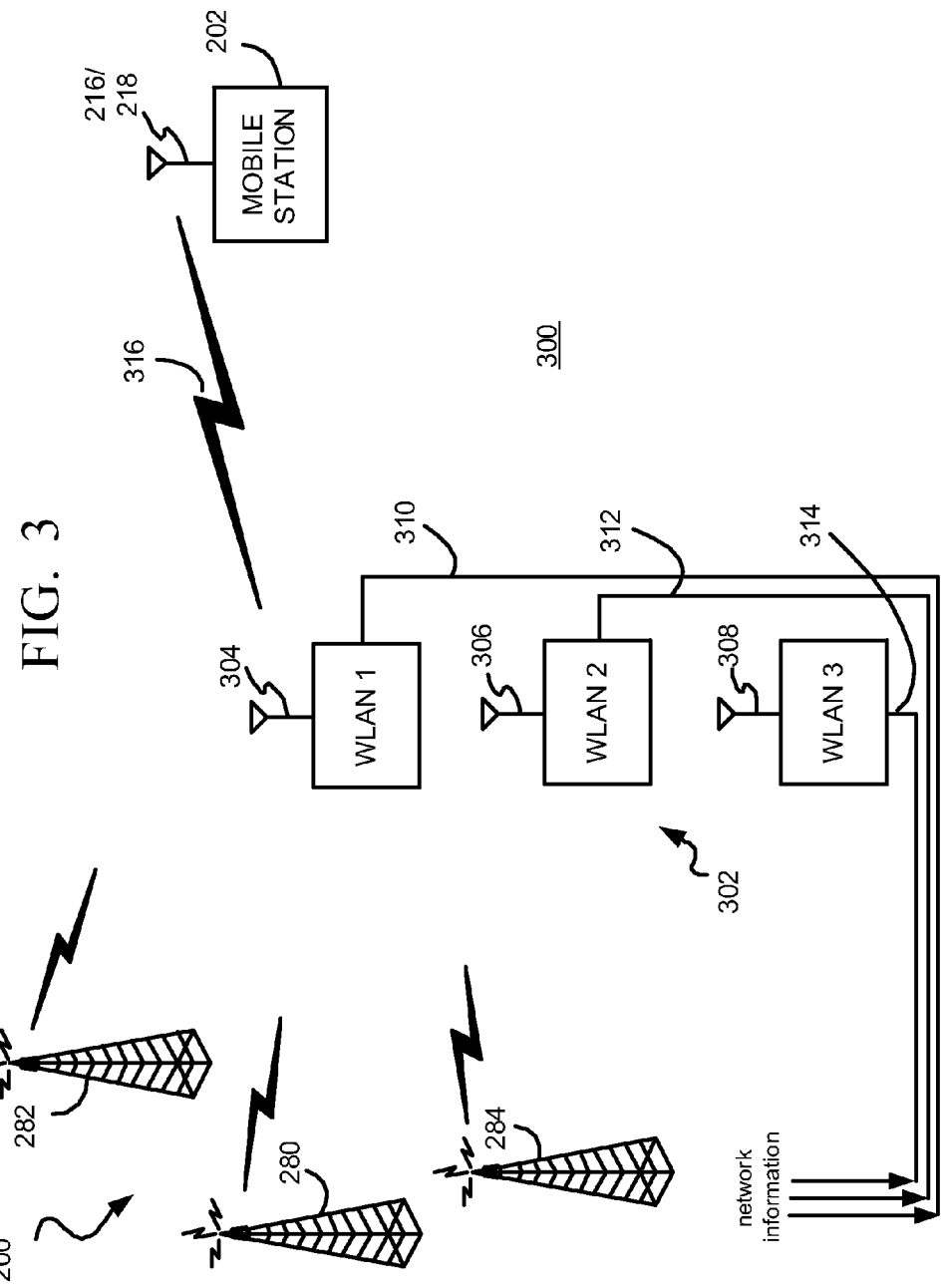

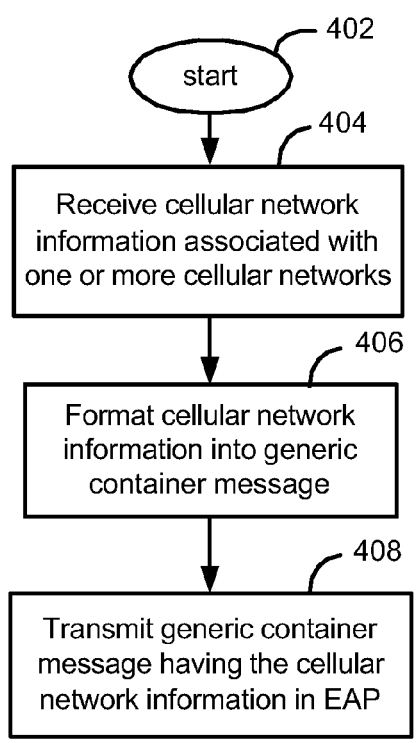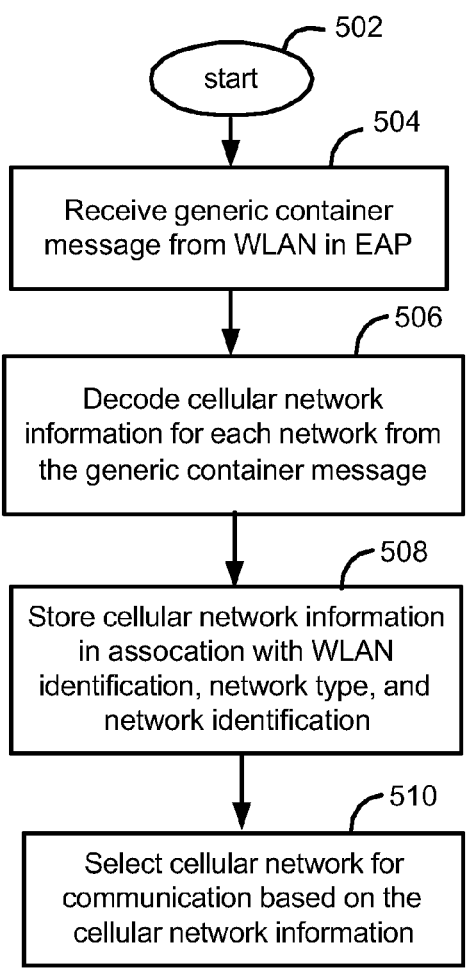

METHODS AND APPARATUS FOR THE COMMUNICATION OF CELLULAR NETWORK INFORMATION BETWEEN A WIRELESS LOCAL AREA NETWORK AND A MOBILE STATION

CROSS-REFERENCE TO RELATED APPLICATION

This application is a continuation of and claims priority to U.S. Non-Provisional Application entitled "Methods And Apparatus For The Communication Of Cellular Network Information Between A Wireless Local Area Network And A Mobile Station" having Ser. No. 10/696,806 and filing date of 30 Oct. 2003.

BACKGROUND

Field of the Technology

The present disclosure relates generally to mobile stations which communicate with cellular networks and wireless local area networks (WLAN), and more particularly to the communication of cellular network information from one or more cellular networks to a mobile station through a WLAN.

Description of the Related Art

Within the cellular industry there is an initiative to configure wireless local area networks (WLANs) to communicate with cellular telecommunications networks so that mobile stations may be able to access both cellular networks and WLANs which provide a higher bandwidth. Traditionally, since WLANs were designed to provide only wireless local networking, there have been no existing protocols to provide advertisements to identify what cellular networks are available to a mobile station. Such information would be useful to provide the mobile station with the ability to identify and switch between different cellular networks and/or cellular network technologies as desired.

There is a further initiative to configure WLANs to be able to communicate with one to many different $3^{rd}$ Generation Partnership Project (3GPP) networks. Such configuration requires that a Universal Subscriber Identity Module (U-SIM) be utilized by the mobile station to identify the end user or subscriber. The U-SIM also contains information that identifies preferred and forbidden cellular networks for the mobile station, each stored as a Mobile Country Code (MCC) and Mobile Network Code (MNC) pair.

Over a wireless link, a WLAN typically broadcasts a textual string called a service set identifier (SSID) to uniquely identify the WLAN to wireless units. Today, most WLANs have been deployed by corporations and wireless Internet Service Providers (ISPs) who use their specific SSID for branding or for "smart client" applications. Thus, WLAN operators are typically reluctant to change their broadcast SSIDs, and it is difficult to broadcast MCC/MNC pairs to mobile stations through WLANs without some protocol modifications. Other cellular network information may be useful to wireless units for making network selection decisions as well.

The Internet Engineering Task Force (IETF) has defined an Extensible Authentication Protocol (EAP) in RFC-2284 for easy extensibility and maintenance of authentication processes. There has been a proposal to extend the EAP mechanism for it to provide Global System for Mobile communications (GSM) network information. Several different cellular protocols for networks and mobile stations exist, however, and techniques to handle the communication of all such information is needed.

BRIEF DESCRIPTION OF THE DRAWINGS

Embodiments of present disclosure will now be described by way of example with reference to attached figures, wherein:

FIG. 1 is a block diagram which illustrates pertinent components of a mobile station which communicates with one or more wireless communication networks;

FIG. 3 is a system diagram which illustrates the mobile station communicating with one or more wireless local area networks (WLANs) which communicate with the one or more cellular networks;

FIG. 4 is a flowchart which describes a WLAN method for the communication of cellular network information;

FIG. 5 is a flowchart which describes a mobile station method for the communication of cellular network information;

DETAILED DESCRIPTION OF THE PREFERRED EMBODIMENTS

Figure 2:
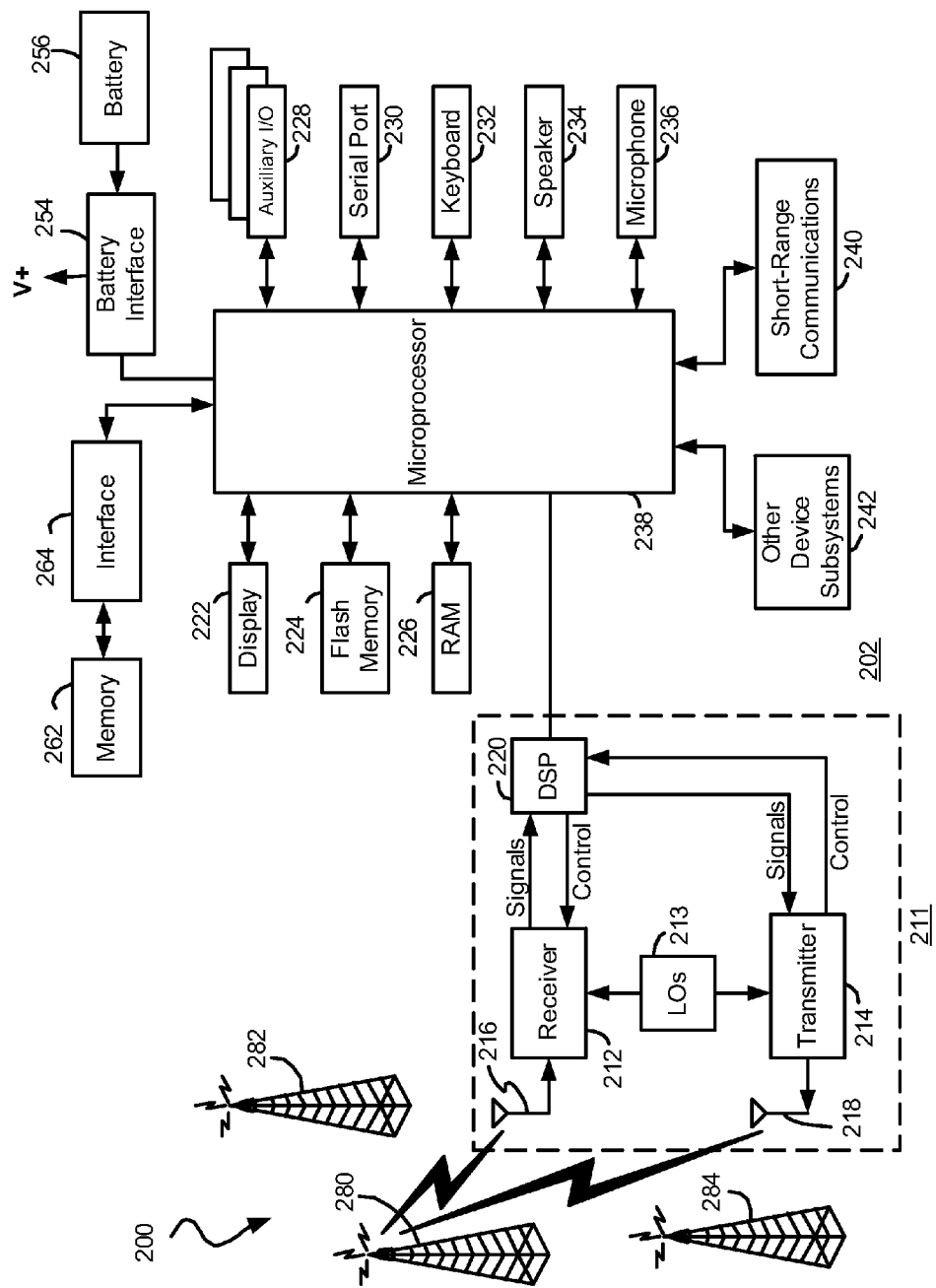
FIG. 2 is a more detailed diagram of a preferred mobile station of FIG. 1.

Methods and apparatus for the communication of cellular network information between a wireless local area network (WLAN) and a mobile station are disclosed. In one illustrative example, the mobile station receives a generic container message from the WLAN in an extensible authentication procedure (EAP). The generic container message includes cellular network information associated with one or more available cellular networks previously received by the WLAN. The generic container message is not technology or standard-specific and therefore it may contain cellular network information from a variety of different cellular networks. The mobile station decodes the generic container message to identify and store the cellular network information in its memory. Preferably, the cellular network information includes information which identifies the cellular networks (e.g. mobile network code and mobile country code) so that the mobile station may appropriately select one of the cellular networks for communication.

FIG. 1 is a block diagram of a communication system 100 which includes a mobile station 102 which communicates through a wireless communication network 104. Mobile station 102 preferably includes a visual display 112, a keyboard 114, and perhaps one or more auxiliary user interfaces (UI) 116, each of which is coupled to a controller 106. Controller 106 is also coupled to radio frequency (RF) transceiver circuitry 108 and one or more antennas 110.

Typically, controller 106 is embodied as a central processing unit (CPU) which runs operating system software in a memory component (not shown). Controller 106 will normally control overall operation of mobile station 102, whereas signal processing operations associated with communication functions are typically performed in RF transceiver circuitry 108. Controller 106 interfaces with device display 112 to display received information, stored information, user inputs, and the like. Keyboard 114, which may be a telephone type keypad or full alphanumeric keyboard, is normally provided for entering data for storage in mobile station 102, information for transmission to network 104, a telephone number to place a telephone call, commands to be executed on mobile station 102, and possibly other or different user inputs.

Mobile station 102 sends communication signals to and receives communication signals from network 104 over a wireless link via antenna 110. RF transceiver circuitry 108 performs functions similar to those of a radio network (RN) 128, including for example modulation/demodulation and possibly encoding/decoding and encryption/decryption. It is also contemplated that RF transceiver circuitry 108 may perform certain functions in addition to those performed by RN 128. In alternate embodiments, RF Transceiver circuitry 108 may comprise a plurality of subsets of components, each subset being configured to access a particular type of network. For example, one subset of components in the RF Transceiver circuitry 108 may be configured to access WLAN networks such as 802.11b, while a second subset of components in the RF transceiver circuitry 108 may be configured to access wireless networks such as Code Division Multiple Access (CDMA), CDMA2000, etc. It will be apparent to those skilled in art that RF transceiver circuitry 108 will be adapted to particular wireless network or networks in which mobile station 102 is intended to operate.

Mobile station 102 includes a battery interface 122 for receiving one or more rechargeable batteries 124. Battery 124 provides electrical power to electrical circuitry in mobile station 102, and battery interface 122 provides for a mechanical and electrical connection for battery 124. Battery interface 122 is coupled to a regulator 126 which regulates power to the device. Mobile station 102 also operates using a memory module 120, such as a Subscriber Identity Module (SIM), a Universal SIM (U-SIM), or a Removable User Identity Module (R-UIM), which is connected to or inserted in mobile station 102 at an interface 118.

Mobile station 102 may consist of a single unit, such as a data communication device, a cellular telephone, a multiple-function communication device with data and voice communication capabilities, a personal digital assistant (PDA) enabled for wireless communication, or a computer incorporating an internal modem. Alternatively, mobile station 102 may be a multiple-module unit comprising a plurality of separate components, including but in no way limited to a computer or other device connected to a wireless modem. In particular, for example, in the mobile station block diagram of FIG. 1, RF transceiver circuitry 108 and antenna 110 may be implemented as a radio modem unit that may be inserted into a port on a laptop computer. In this case, the laptop computer would include display 112, keyboard 114, one or more auxiliary UIs 116, and controller 106 embodied as the computer's CPU. It is also contemplated that a computer or other equipment not normally capable of wireless communication may be adapted to connect to and effectively assume control of RF transceiver circuitry 108 and antenna 110 of a single-unit device such as one of those described above. Such a mobile station 102 may have a more particular implementation as described later in relation to mobile station 202 of FIG. 2.

Mobile station 102 communicates in and through wireless communication network 104. Wireless communication network 104 may operate in accordance with any suitable communication technologies, such as Global Systems for Mobile communications (GSM), General Packet Radio Service (GPRS), Universal Mobile Telecommunications System (UMTS), Code Division Multiple Access (CDMA), IS-95, IS-2000, CDMA2000, 802.11b, 802.11g, etc. or combinations thereof. In the particular embodiment of FIG. 1, wireless network 104 is a Third Generation (3G) supported network based on Code Division Multiple Access (CDMA) technologies. In particular, wireless network 104 is a CDMA2000 network which includes fixed network components coupled as shown in FIG. 1. Wireless network 104 of the CDMA2000-type includes a Radio Network (RN) 128, a Mobile Switching Center (MSC) 130, a Signaling System 7 (SS7) network 140, a Home Location Register/Authentication Center (HLR/AC) 138, a Packet Data Serving Node (PDSN) 132, an IP network 134, and a Remote Authentication Dial-In User Service (RADIUS) server 136. SS7 network 140 is communicatively coupled to a network 142 (such as a Public Switched Telephone Network or PSTN), whereas IP network is communicatively coupled to a network 144 (such as the Internet).

In the present network embodiment (CDMA2000), mobile station 102 communicates with RN 128 which performs functions such as call-setup, call processing, and mobility management. RN 128 includes a plurality of base station transceiver systems that provide wireless network coverage for a particular coverage area commonly referred to as a "cell". A given base station transceiver system of RN 128, such as the one shown in FIG. 1, transmits communication signals to and receives communication signals from mobile stations within its cell. The base station transceiver system 128 normally performs such functions as modulation and possibly encoding and/or encryption of signals to be transmitted to mobile stations in accordance with particular, usually predetermined, communication protocols and parameters, under control of its controller. The base station transceiver system similarly demodulates and possibly decodes and decrypts, if necessary, any communication signals received from mobile station 102 within its cell. Communication protocols and parameters may vary between different networks. For example, one network may employ a different modulation scheme and operate at different frequencies than other networks. The underlying services may also differ based on its particular protocol revision.

The wireless link shown in communication system 100 of FIG. 1 represents one or more different channels, typically different radio frequency (RF) channels, and associated protocols used between wireless network 104 and mobile station 102. An RF channel is a limited resource that must be conserved, typically due to limits in overall bandwidth and a limited battery power of mobile station 102. Those skilled in art will appreciate that a wireless network in actual practice may include hundreds of cells depending upon desired overall expanse of network coverage. All pertinent components may be connected by multiple switches and routers (not shown), controlled by multiple network controllers.

For all mobile station's 102 registered with a network operator, permanent data (such as mobile station 102 user's profile) as well as temporary data (such as mobile station's 102 current location) are stored in a HLR/AC 138. In case of a voice call to mobile station 102, HLR/AC 138 is queried to determine the current location of mobile station 102. A Visitor Location Register (VLR) of MSC 130 is responsible for a group of location areas and stores the data of those mobile stations that are currently in its area of responsibility. This includes parts of the permanent mobile station data that have been transmitted from HLR/AC 138 to the VLR for faster access. However, the VLR of MSC 130 may also assign and store local data, such as temporary identifications. Mobile station 102 is also authenticated on system access by HLR/AC 138. In order to provide packet data services to mobile station 102 in a CDMA2000-based network, RN 128 communicates with PDSN 132. PDSN 132 provides access to the Internet 144 (or intranets, Wireless Application Protocol (WAP) servers, etc.) through IP network 134. PDSN 132 also provides foreign agent (FA) functionality in mobile IP networks as well as packet transport for virtual private networking. PDSN 132 has a range of IP addresses and performs IP address management, session maintenance, and optional caching. RADIUS server 136 is responsible for performing functions related to authentication, authorization, and accounting (AAA) of packet data services, and may be referred to as an AAA server.

Those skilled in art will appreciate that wireless network 104 may be connected to other systems, possibly including other networks, not explicitly shown in FIG. 1. A network will normally be transmitting at very least some sort of paging and system information on an ongoing basis, even if there is no actual packet data exchanged. Although the network consists of many parts, these parts all work together to result in certain behaviours at the wireless link.

FIG. 2 is a detailed block diagram of a preferred mobile station 202. Mobile station 202 is preferably a two-way communication device having at least voice and advanced data communication capabilities, including the capability to communicate with other computer systems. Depending on the functionality provided by mobile station 202, it may be referred to as a data messaging device, a two-way pager, a cellular telephone with data messaging capabilities, a wireless Internet appliance, or a data communication device (with or without telephony capabilities). Mobile station 202 may communicate with any one of a plurality of base station transceiver systems 200 within its geographic coverage area.

Mobile station 202 will normally incorporate a communication subsystem 211, which includes a receiver 212, a transmitter 214, and associated components, such as one or more (preferably embedded or internal) antenna elements 216 and 218, local oscillators (LOs) 213, and a processing module such as a digital signal processor (DSP) 220. Communication subsystem 211 is analogous to RF transceiver circuitry 108 and antenna 110 shown in FIG. 1. In alternate embodiments, communication subsystem 211 may comprise a plurality of subsets of receivers 212, transmitters 214 and associated components, such as one or more antenna elements 216 and 218, and LOs 213, each subset being configured to access a particular type of wireless network. For example, one set could be configured to access WLANs, while another set may be configured to access wireless networks such as CDMA, CDMA2000, etc. As will be apparent to those skilled in field of communications, the particular design of communication subsystem 211 depends on the communication network or networks in which mobile station 202 is intended to operate.

Mobile station 202 may send and receive communication signals over the network after required network registration or activation procedures have been completed. Signals received by antenna 216 through the network are input to receiver 212, which may perform such common receiver functions as signal amplification, frequency down conversion, filtering, channel selection, and like, and in example shown in FIG. 2, analog-to-digital (A/D) conversion. A/D conversion of a received signal allows more complex communication functions such as demodulation and decoding to be performed in DSP 220. In a similar manner, signals to be transmitted are processed, including modulation and encoding, for example, by DSP 220. These DSP-processed signals are input to transmitter 214 for digital-to-analog (D/A) conversion, frequency up conversion, filtering, amplification and transmission over communication network via antenna 218. DSP 220 not only processes communication signals, but also provides for receiver and transmitter control. For example, the gains applied to communication signals in receiver 212 and transmitter 214 may be adaptively controlled through automatic gain control algorithms implemented in DSP 220.

Network access is associated with a subscriber or user of mobile station 202, and therefore mobile station 202 requires a memory module 262, such as a Subscriber Identity Module or "SIM" card, a Universal SIM (U-SIM), or a Removable User Identity Module (R-UIM), to be inserted in or connected to an interface 264 of mobile station 202 in order to operate in the network. Since mobile station 202 is a mobile battery-powered device, it also includes a battery interface 254 for receiving one or more rechargeable batteries 256. Such a battery 256 provides electrical power to most if not all electrical circuitry in mobile station 202, and battery interface 254 provides for a mechanical and electrical connection for it. The battery interface 254 is coupled to a regulator (not shown in FIG. 2) which provides power V+ to all of the circuitry.

Mobile station 202 includes a microprocessor 238 (which is one implementation of controller 106 of FIG. 1) which controls overall operation of mobile station 202. This control includes network selection techniques of the present application. Communication functions, including at least data and voice communications, are performed through communication subsystem 211. Microprocessor 238 also interacts with additional device subsystems such as a display 222, a flash memory 224, a random access memory (RAM) 226, auxiliary input/output (I/O) subsystems 228, a serial port 230, a keyboard 232, a speaker 234, a microphone 236, a short-range communications subsystem 240, and any other device subsystems generally designated at 242. Some of the subsystems shown in FIG. 2 perform communication-related functions, whereas other subsystems may provide "resident" or on-device functions. Notably, some subsystems, such as keyboard 232 and display 222, for example, may be used for both communication-related functions, such as entering a text message for transmission over a communication network, and device-resident functions such as a calculator or task list. Operating system software used by microprocessor 238 is preferably stored in a persistent store such as flash memory 224, which may alternatively be a read-only memory (ROM) or similar storage element (not shown). Those skilled in the art will appreciate that the operating system, specific device applications, or parts thereof, may be temporarily loaded into a volatile store such as RAM 226.

Microprocessor 238, in addition to its operating system functions, preferably enables execution of software applications on mobile station 202. A predetermined set of applications which control basic device operations, including at least data and voice communication applications, will normally be installed on mobile station 202 during its manufacture. A preferred application that may be loaded onto mobile station 202 may be a personal information manager (PIM) application having the ability to organize and manage data items relating to user such as, but not limited to, e-mail, calendar events, voice mails, appointments, and task items. Naturally, one or more memory stores are available on mobile station 202 and SIM 256 to facilitate storage of PIM data items and other information.

The PIM application preferably has the ability to send and receive data items via the wireless network. In a preferred embodiment, PIM data items are seamlessly integrated, synchronized, and updated via the wireless network, with the mobile station user's corresponding data items stored and/or associated with a host computer system thereby creating a mirrored host computer on mobile station 202 with respect to such items. This is especially advantageous where the host computer system is the mobile station user's office computer system. Additional applications may also be loaded onto mobile station 202 through network, an auxiliary I/O subsystem 228, serial port 230, short-range communications subsystem 240, or any other suitable subsystem 242, and installed by a user in RAM 226 or preferably a non-volatile store (not shown) for execution by microprocessor 238. Such flexibility in application installation increases the functionality of mobile station 202 and may provide enhanced on-device functions, communication-related functions, or both. For example, secure communication applications may enable electronic commerce functions and other such financial transactions to be performed using mobile station 202.

In a data communication mode, a received signal such as a text message, an e-mail message, or web page download will be processed by communication subsystem 211 and input to microprocessor 238. Microprocessor 238 will preferably further process the signal for output to display 222 or alternatively to auxiliary I/O device 228. A user of mobile station 202 may also compose data items, such as e-mail messages, for example, using keyboard 232 in conjunction with display 222 and possibly auxiliary I/O device 228. Keyboard 232 is preferably a complete alphanumeric keyboard and/or telephone-type keypad. These composed items may be transmitted over a communication network through communication subsystem 211.

For voice communications, the overall operation of mobile station 202 is substantially similar, except that the received signals would be output to speaker 234 and signals for transmission would be generated by microphone 236. Alternative voice or audio I/O subsystems, such as a voice message recording subsystem, may also be implemented on mobile station 202. Although voice or audio signal output is preferably accomplished primarily through speaker 234, display 222 may also be used to provide an indication of the identity of a calling party, duration of a voice call, or other voice call related information, as some examples.

Serial port 230 in FIG. 2 is normally implemented in a personal digital assistant (PDA)-type communication device for which synchronization with a user's desktop computer is a desirable, albeit optional, component. Serial port 230 enables a user to set preferences through an external device or software application and extends the capabilities of mobile station 202 by providing for information or software downloads to mobile station 202 other than through a wireless communication network. The alternate download path may, for example, be used to load an encryption key onto mobile station 202 through a direct and thus reliable and trusted connection to thereby provide secure device communication.

Short-range communications subsystem 240 of FIG. 2 is an additional optional component which provides for communication between mobile station 202 and different systems or devices, which need not necessarily be similar devices. For example, subsystem 240 may include an infrared device and associated circuits and components, or a Bluetooth™ communication module to provide for communication with similarly-enabled systems and devices. Bluetooth™ is a registered trademark of Bluetooth SIG, Inc.

FIG. 3 is a system diagram 300 which illustrates mobile station 202 communicating with one or more wireless local area networks (WLANs) 302 which communicate with the one or more cellular networks 200. The WLANs 302 shown in FIG. 3 include a first WLAN 304, a second WLAN 306, and a third WLAN 308, although many others may be available for use by mobile station 202 in the same or different geographic region. Mobile station 202 and the WLANs communicate over radio communication links, such as a radio communication link 316 between mobile station 202 and WLAN 304. WLANs 302 are typically wire-connected to the Internet using traditional Telco connections to provide higher bandwidth data communications for mobile station 202. As shown, WLANs 304, 306, and 308 may receive information from cellular networks 200 through wired connections 310, 312, and 314, respectively, or by other suitable means. WLANs 302 may operate in accordance with IEEE or ETSI standards, for example, although any suitable communication technologies may be utilized. WLANs 302 may be positioned in any suitable area or environment, and are typically found in coffee shops, restaurants, hotels, airports, and company offices. Areas within which WLANs 302 provide coverage may be referred to as "hot spots".

FIG. 4 is a flowchart which describes a WLAN method for the communication of cellular telecommunications network information between the WLAN and a mobile station. This method may be performed in the environment described in relation to FIG. 3. Beginning at a start block 402, the WLAN receives cellular network information associated with one or more cellular networks (step 404). The cellular network information may be received by the WLAN directly from the different cellular networks or indirectly through a database of the WLAN or the cellular networks. If the database approach is utilized, the database may be populated either dynamically from the cellular broadcast or manually via a user interface. The cellular network information is indeed network information associated with the cellular network and may include various network attributes. Preferably, the cellular network information includes network-identifying information and/or attributes including information that uniquely identifies a cellular network (e.g. a system identification (SID), and/or a mobile country code (MCC) and mobile network code (MNC) pair). The cellular network information may include other or additional information, such as available neighboring cellular channels.

As cellular network information may be received from networks associated with different cellular technologies and/or standards, the cellular network information received may vary in content and format. For example, the cellular format may be based on $3^{rd}$ Generation Partnership Project (3GPP), 3GPP2, or Internet Engineering Task Force (IETF). 3GPP is known to define GSM/GPRS and UMTS standards, whereas 3GGP2 is known to define IS-95, CDMA2000, and 1×RTT. Thus, the WLAN is configured to receive cellular network information in accordance with two or more different cellular communication protocols. The WLAN stores this cellular network information in memory, preferably in an organized manner according to technology, network, and content (see Table 1 below).

TABLE 1

An example of the organized storage of cellular network
information in the WLAN; also an example of the order in
which the cellular network information is generally
transmitted in the generic container message by the
WLAN; and also an example of the organized storage of
cellular network information in the mobile station.

| TECHNOLOGY/ STANDARD | NETWORK IDENTIFIER (e.g. SID) | CELLULAR NETWORK INFORMATION |
|---|---|---|
| 3GPP | Network 1 | Broadcast Information 1 |
| | | Broadcast Information 2 |
| | | . . . |
| | | Broadcast Information N |
| | Network 2 | Broadcast Information 1 |
| | | Broadcast Information 2 |
| | | . . . |
| | | Broadcast Information N |
| | . . . | . . . |
| | Network M | Broadcast Information 1 |
| | | Broadcast Information 2 |
| | | . . . |
| | | Broadcast Information N |
| 3GPP2 | Network 3 | Broadcast Information 1 |
| | | Broadcast Information 2 |
| | | . . . |
| | | Broadcast Information N |
| | Network 4 | Broadcast Information 1 |
| | | Broadcast Information 2 |
| | | . . . |
| | | Broadcast Information N |
| | . . . | . . . |
| | Network P | Broadcast Information 1 |
| | | Broadcast Information 2 |
| | | . . . |
| | | Broadcast Information N |
| Other | Network 5 | Broadcast Information 1 |
| | | Broadcast Information 2 |
| | | . . . |
| | | Broadcast Information N |
| | Network 6 | Broadcast Information 1 |
| | | Broadcast Information 2 |
| | | . . . |
| | | Broadcast Information N |
| | . . . | . . . |
| | Network Q | Broadcast Information 1 |
| | | Broadcast Information 2 |
| | | . . . |
| | | Broadcast Information N |

The WLAN then formats the cellular network information in a generic container message (step 406). As its name suggests, the generic container message is not technology or standard-specific and may contain cellular network information from any one or more of a variety of different cellular networks (e.g. 3GPP, 3GPP2, or other suitable standard). Technology-specific information in the generic container message may be identified by an appropriate identification, such as a technology/organization identification. A particular example of the format for the generic container message will be described later in relation to FIG. 6. Next, the WLAN performs an extensible authentication procedure (EAP) with a mobile station which is attempting to acquire it. During the EAP with the mobile station, the WLAN transmits the generic container message to the mobile station (step 408). The WLAN formats and transmits the generic container message preferably in an ordered fashion according to technology, network, and content/information (see Table 1 above).

FIG. 5 is a flowchart which describes a mobile station method for the communication of cellular telecommunications network information between a WLAN and the mobile station. The mobile station scans to identify available WLANs in its coverage area and attempts to acquire one of them. Beginning at a start block 502, the mobile receives a generic container message from the selected WLAN during an extensible authentication procedure (EAP) (step 504). The mobile station decodes cellular network information associated with one or more cellular networks from the generic container message (step 506). The cellular network information is indeed network information associated with the cellular network and may include various network attributes. Preferably, this cellular network information is broadcast information and includes information that uniquely identifies a cellular network (e.g. a system identification (SID), and/or a mobile country code (MCC) and mobile network code (MNC) pair). The cellular network information may also include other information, such as available neighboring cellular channels.

As the cellular network information may be from networks associated with different cellular technologies and/or standards, the cellular network information received may vary in content and format. For example, the cellular information content and format may be based on $3^{rd}$ Generation Partnership Project (3GPP), 3GPP2, or other suitable standard. 3GPP is known to define GSM/GPRS and UMTS standards, whereas 3GGP2 is known to define IS-95, CDMA2000, and 1xRTT. Thus, the mobile station may be configured to receive and decode information in accordance with two or more different cellular formats/protocols. Since technology-specific information in the generic container message is identified by an appropriate identification, such as a technology/organization identification, the mobile station uses this identification to decode appropriately.

Next, the mobile station stores this cellular network information in memory (step 508). Preferably, the mobile station stores the cellular network information in association with an identifier of the WLAN (its set service identifier or SSID), preferably in an organized fashion according to technology, network, and content/information (see Table 1 above). The mobile station will retain storage of this information for all different WLANs that it encounters. The memory in which this information is stored may be a permanently-installed memory device (e.g. Flash memory 224 of FIG. 2) or a removable memory device (e.g. memory 262 of FIG. 2 which may be a Subscriber Identity Module (SIM), a Universal SIM (U-SIM), or a Removable User Identity Module (R-UIM)). The mobile station may retain storage of all of this information indefinitely or, alternatively, may delete some of this information over time (e.g. depending on memory space availability and frequency of use of the information).

After the cellular network information is stored in the mobile station, the mobile station may utilize the MCC/MNC pairs from the cellular network information to perform network selection (step 510). In particular, the mobile station selects one of these networks (e.g. its "home" or other network in accordance with a preferred network list or through manual selection via a user interface) by signaling the WLAN. In particular, the mobile station signals the WLAN with the selected network using a Network Access Identifier (NAI) in the EAP. Thus, the EAP with receipt of the generic container message having MCC/MNC pairs takes place of a conventional scanning operation of the mobile station for cellular network selection. Thus, the mobile station provides the automatic or manual selection of the network during the EAP through the WLAN based on the received MCC/MNC pairs and its home network or preferred network list (e.g. on its SIM or U-SIM).

Figure 6:
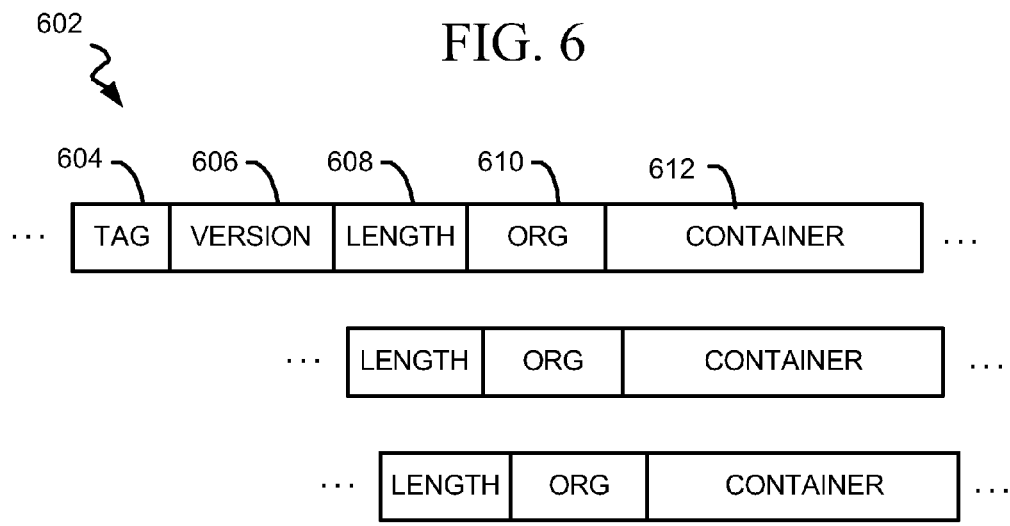
FIG. 6 is one example of a message format for a generic container message transmitted by the WLAN and received at the mobile station.

FIG. 6 is one example of a message format for a generic container message 602 transmitted by the WLAN and received at the mobile station. In this particular example, generic container message 602 includes a tag field 604, a version field 606, a length field 608, a technical/standards organization field 610, and a technology-specific container field 612. Tag field 604 contains data that identifies the message as a generic container message (e.g. a number, a binary value, a string, etc.); version field 606 contains data that identifies a (standards) version of generic container message 602; organization field 608 contains data that identifies what for a defines the content and format of technology-specific container 612; length field 610 contains data that identifies a data length of technology-specific container 612; and technology-specific container field 612 includes cellular broadcast information which is specific to a particular cellular technology identified in organization field 608. As shown in FIG. 6, one or more technology-specific containers may be sequentially provided in generic container message 602 (depending on the number of cellular networks available in the coverage area of the WLAN) along with a corresponding length and organization identifier. Each organization field identifies the specific cellular technology information which follows it.

As apparent, generic container message 602 is "generic" in that the content and format of the information in technology-specific container 612 may be defined by any cellular standard organization which is identified in organization field 608. Although the entire generic container message 602 has a predetermined message format (as this specific example reveals), the content and format within technology-specific container 612 is left flexible to be defined by different cellular standard organizations. The mobile station uses organization field 608 to select the appropriate technique for decoding the information in technology-specific container 612. Advantageously, the present technique is flexible and extensible and allows for the separation of specification work between the Internet Engineering Task Force (IETF) and cellular-specific bodies (e.g. 3GPP, 3GPP2, etc.).

Figure 7:
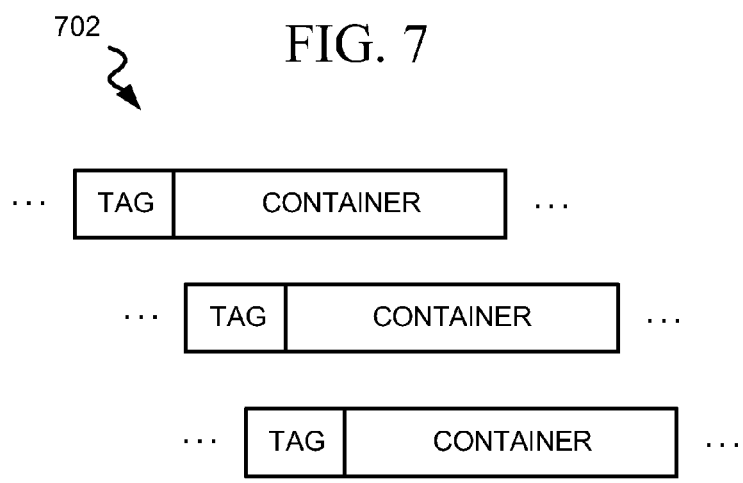
FIG. 7 is another example of a message format for a generic container message transmitted by the WLAN and received at the mobile station.

The message format for generic container message 602 in FIG. 6 is a specific example only and variations are numerous. For example, the generic container message may include a tag field and a technology-specific container but not the others. This alternative example of a generic container message 702 is shown in FIG. 7. In this case, the specific cellular technology format/protocol found in the technology-specific container may be implied. Alternatively, the specific cellular technology format/protocol may be indicated in the tag field. The mobile station reads the information in the technology-specific container which ends when another tag field is identified. As another example, the generic container message includes a tag field, a version field, and the technology-specific container but not the others. In even another example, the generic container message includes a tag field, a version field, a length field, and the technology-specific container.

Final Comments. Methods and apparatus for the communication of cellular network information between a wireless local area network (WLAN) and a mobile station have been described. In one illustrative example, the mobile station receives a generic container message from the WLAN in an extensible authentication procedure (EAP). The generic container message includes cellular network information associated with one or more available cellular networks previously received by the WLAN. The generic container message is not technology or standard-specific and therefore it may contain cellular network information from a variety of different cellular networks (e.g. 3GPP, 3GPP2, IETF, etc.). The mobile station decodes the generic container message to identify and store the cellular network information in its memory. Preferably, the cellular network information includes information which identifies the cellular networks (e.g. an MCC/MNC pair) so that the mobile station may appropriately select one of the cellular networks for communication.

The above-described embodiments of the present application are intended to be examples only. Those of skill in the art may effect modifications and variations to the particular embodiments without departing from the scope of the application. The invention described herein in the recited claims intend to embrace all suitable changes in technology.

What is claimed is:

1. A method in a wireless local area network (WLAN) for use in communicating 3$^{rd}$ Generation Partnership Project (3GPP) network information, the method comprising:
    obtaining by the WLAN, cellular network information associated with and identifying at least one cellular network available for communication with a mobile communication device, the cellular network information indicating 3rd Generation Partnership Project (3GPP) network information, the cellular network information including first network information which identifies a first cellular network, and the first network information including a Mobile Network Code (MNC) and a Mobile Country Code (MCC) which identifies the at least one cellular network;
    transmitting, from the WLAN to a mobile station, a generic container, wherein the generic container is defined by an IEEE 802.11 standard, content in the generic container is configured according to a 3GPP cellular standard, and the generic container comprises a container field and a version field adjacent to a length field,
    the container field including at least one of: neighboring cellular channels or at least one MNC and MCC pair that indicates at least one 3GPP network, the at least one MNC/MCC pair for use by the mobile station to select a 3GPP network to access,
    the length field identifying a data length of the container field, the version field identifying a version of the generic container, and
    wherein the content in the generic container is received from a network, and transmitting the generic container comprises transmitting the generic container in at least one of an extensible authentication protocol (EAP), an advertisement protocol, and a wireless application protocol (WAP).

2. The method of claim 1, wherein the WLAN is operative in accordance with Institute of Electrical and Electronics Engineers (IEEE) 802.11.

3. A wireless local area network (WLAN) processor of a WLAN, the WLAN processor being configured to:
    obtain by the WLAN, cellular network information associated with and identifying at least one cellular network available for communication with a mobile communication device, the cellular network information indicating 3rd Generation Partnership Project (3GPP) network information, the cellular network information including first network information which identifies a first cellular network, and the first network information including a Mobile Network Code (MNC) and a Mobile Country Code (MCC) which identifies the at least one cellular network;

transmit, from the WLAN to a mobile station, a generic container, wherein the generic container is defined by an IEEE 802.11 standard, content in the generic container is configured according to a 3GPP cellular standard, and the generic container comprises a container field and a version field adjacent to a length field, the container field including at least one of: neighboring cellular channels or at least one MNC and MCC pair that indicates at least one 3GPP network, the at least one MNC/MCC pair for use by the mobile station to select a 3GPP network to access, the length field identifying a data length of the container field, the version field identifying a version of the generic container, and wherein content in the generic container is received from a network, and transmitting the generic container comprises transmitting the generic container in at least one of an extensible authentication protocol (EAP), an advertisement protocol, and a wireless application protocol (WAP).

4. The WLAN processor of claim 3, which is operative in accordance with Institute of Electrical and Electronics Engineers (IEEE) 802.11.

5. A method in a mobile station for processing network information from a wireless local area network (WLAN), the method comprising:

receiving, from the WLAN, a generic container, wherein the generic container is defined by an IEEE 802.11 standard, content in the generic container is configured according to a 3GPP cellular standard, and the generic container comprises a container field and a version field adjacent to a length field, the container field including at least one of: neighboring cellular channels or at least one Mobile Network Code (MNC) and Mobile Country Code (MCC) pair that indicates at least one 3GPP network, the at least one MNC/MCC pair for use by the mobile station to select a 3GPP network to access, the length field identifying a data length of the container field, the version field identifying a version of the generic container, and wherein the WLAN receives content in the generic container from a network, and receiving the generic container comprises receiving the generic container in at least one of an extensible authentication protocol (EAP), an advertisement protocol, and a wireless application protocol (WAP).

6. The method of claim 5, wherein the mobile station is operative in accordance with Institute of Electrical and Electronics Engineers (IEEE) 802.11.

7. A mobile station, comprising:
a controller;
memory coupled to the controller;
a radio frequency (RF) transceiver coupled to the controller;
the RF transceiver being operative to receive, from the WLAN, a generic container, wherein the generic container is defined by an IEEE 802.11 standard, content in the generic container is configured according to a 3GPP cellular standard, and the generic container comprises a container field and a version field adjacent to a length field, the container field including at least one of: neighboring cellular channels or at least one Mobile Network Code (MNC) and Mobile Country Code (MCC) pair that indicates at least one 3GPP network, the at least one MNC/MCC pair for use by the mobile station to select a 3GPP network to access, the length field identifying a data length of the container field, the version field identifying a version of the generic container, and wherein the WLAN receives content in the generic container from a network, and receiving the generic container comprises receiving the generic container in at least one of an extensible authentication protocol (EAP), an advertisement protocol, and a wireless application protocol (WAP).

8. The mobile station of claim 7, which is operative in accordance with Institute of Electrical and Electronics Engineers (IEEE) 802.11.

* * * * *